Dec. 10, 1963  W. H. EBURN, JR., ETAL  3,113,496
PHOTOGRAPHIC APPARATUS

Filed Nov. 25, 1960  2 Sheets-Sheet 1

Dec. 10, 1963  W. H. EBURN, JR., ETAL  3,113,496
PHOTOGRAPHIC APPARATUS
Filed Nov. 25, 1960  2 Sheets-Sheet 2
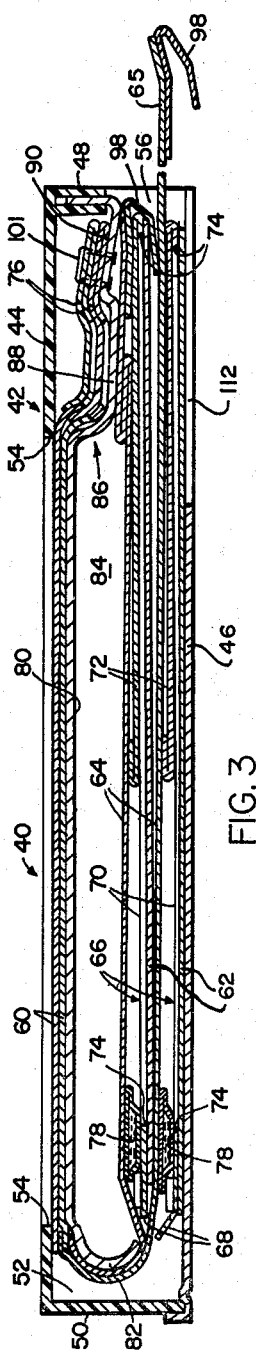
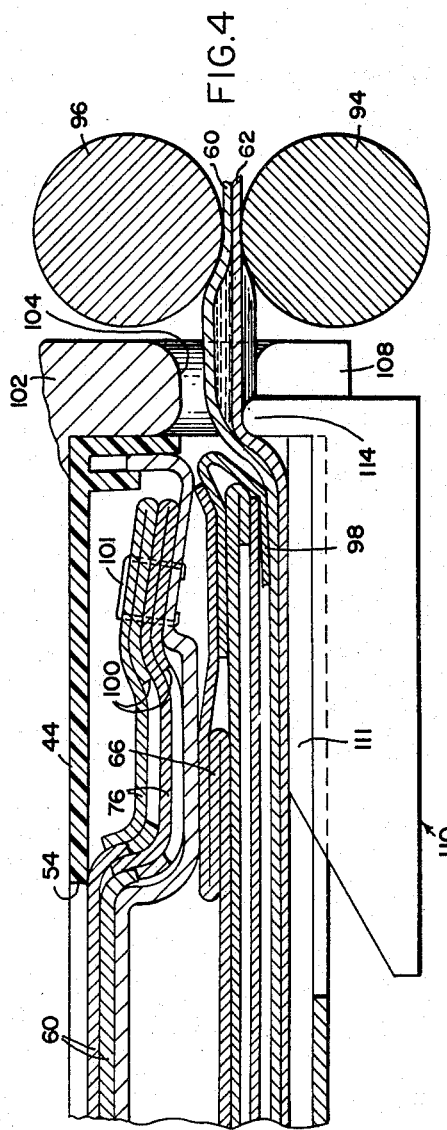
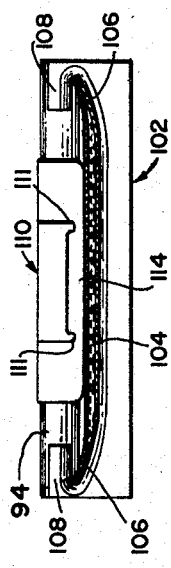
INVENTORS
William H. Eburn, Jr.
and
BY Howard T. Hill
Brown and Mikulka
and
Robert E. Corb
Attorneys

United States Patent Office 3,113,496
Patented Dec. 10, 1963

3,113,496
PHOTOGRAPHIC APPARATUS
William H. Eburn, Jr., East Weymouth, and Howard T. Wills, Beverly, Mass., assignors to Polaroid Corporation, Cambridge, Mass., a corporation of Delaware
Filed Nov. 25, 1960, Ser. No. 71,698
8 Claims. (Cl. 95—13)

This application is concerned with photographic apparatus and more particularly with apparatus such as a camera wherein photographic sheet materials are exposed and processed.

An object of the invention is to provide, in photographic apparatus for exposing and processing photographic sheet materials, a pair of pressure-applying members for spreading a processing fluid in a layer between a pair of superposed sheets and novel and improved means for restraining one of the sheets against movement during movement of the other of said sheets through said apparatus into superposition with said one sheet and for controlling the distribution of the processing fluid between said sheets during spreading of said fluid by said pressure-applying members.

Another object of the invention is to provide means, as described above, for preventing movement of a sheet and controlling the distribution of the processing fluid, which means is dependable in its operation and is characterized by a simple and inexpensive construction.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a sectional view taken substantially midway between the sides of a photographic film pack adapted to use in the camera of FIGURE 1;

FIG. 4 is a fragmentary sectional view illustrating components of the camera and film pack and showing the details of the components and their operative relationships; and FIG. 5 is an end view of components of FIG. 2 showing the components in their operative relationship.

Figure 1:
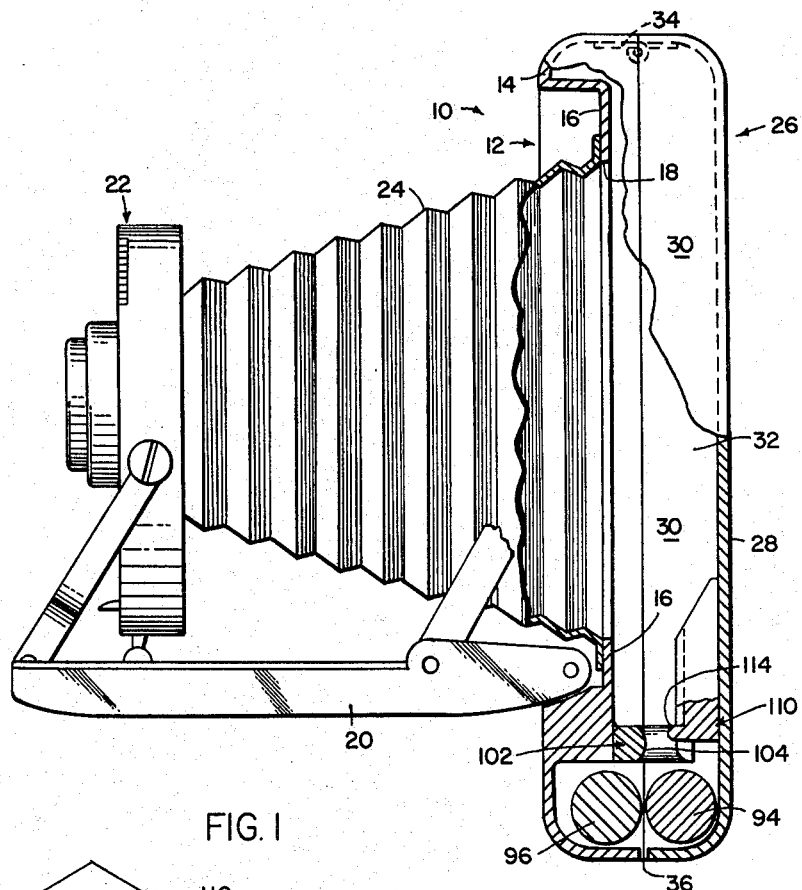
FIGURE 1 is an elevational view, partially in section, of a camera embodying the invention, the section being taken substantially midway between the sides of the camera.
Figure 2:
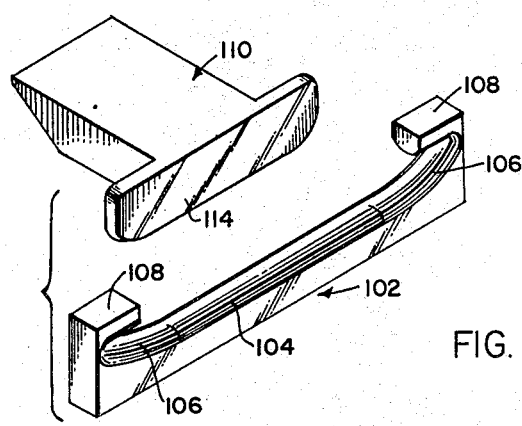
FIG. 2 is an exploded perspective view of components of the camera of FIGURE 1.

The present invention is incorporated in photographic apparatus such as a camera, wherein a photosensitive sheet is exposed and thereafter treated with a fluid spread in contact with the photosensitive sheet. In cameras of this type, the photosensitive sheet is superposed with another sheet and the two sheets are moved in superposition relative to and between a pair of pressure-applying members for distributing a processing fluid in a thin layer between the superposed sheets. Such a camera (designated 10) is shown, by way of example, in FIGURE 1 of the drawings and generally comprises a housing including a forward section 12 having a forward wall 14 with a recessed or reentrant section 16 including an exposure aperture 18 in the reentrant section through which exposure of a photosensitive sheet, positioned within the camera, may be effected. A hinged door 20 is provided for covering recessed section 16 and for mounting a conventional lens and shutter assembly 22 connected to recessed section 16 by a collapsible bellows 24 secured at one end to the lens and shutter assembly, and at its other end to the recessed section in surrounding relation to aperture 18. While the apparatus is shown in the form of a camera, it may also be constructed in the form of a camera back or a film pack adapter intended to be mounted on or coupled to the rear of a camera, in which case, the door, lens and shutter assembly and bellows would be eliminated, and the front of the housing would be constructed for attachment to the camera or other exposure device with which it is intended to be employed.

The camera housing includes a rear section 26 having a rear wall 28 and side walls 30 cooperating with the forward housing section to provide a chamber 32 behind aperture 18 for containing a film pack in position for exposure through aperture 18. The film pack is mounted within chamber 32 with a forward section of the pack located against the rear surface of reentrant section 16. The rear housing section 26 is pivotally secured to forward housing section 12 at one end of the housing, herein shown and designated for purposes of description as the upper end, by a hinge 34, thereby permitting the two housing sections to be separated to allow loading of a film pack into chamber 32. An opening 36 is provided at the lower end of the camera housing intermediate the forward and rear housing sections to permit withdrawal of a film unit from the housing. Suitable latch means (not shown) of a conventional type are also provided in the lower portion of the housing for retaining the two housing sections together in the closed or operative position shown in the drawings.

Camera 10, as indicated, is designed for use with a film pack, that is, an assemblage of individual film units each adapted to be exposed and processed to produce a visible image. The invention, however, finds equal utility in other types of cameras of the so-called self-developing type, including cameras adapted for use with roll film or with individual film units, rather than in assemblages of film units. The camera shown is particularly adapted for use with a film pack of the type shown in U.S. Patent No. 2,991,702, issued July 11, 1961 in the of Vaito K. Eloranta. The film pack, shown by way of example, in FIGS. 3 and 4 of the drawings, comprises a plurality of film units, each adapted to be exposed and processed in a camera for producing a positive photographic print, enclosed in a light-proof container which allows the film units to be exposed in succession. Each film unit comprises a photosensitive sheet which may be exposed for producing a photographic image, a second or print-receiving sheet for carrying a positive transfer image formed from the photosensitive sheet, a rupturable container of a fluid agent for reacting with the exposed photosensitive sheet to produce the positive transfer image on the second sheet, and means including a leader for coupling the two sheets and withdrawing the sheets in superposition from the camera. Following exposure of the photosensitive sheet of each film unit, the film unit is withdrawn from the container between a pair of pressure-applying members in the camera for spreading the processing fluid from the rupturable container of the film unit between the photosensitive and second sheets.

The film pack, designated 40, comprises a generally parallelepiped-shaped container 42 having a forward wall 44, rear wall 46, end walls 48 and 50 and side walls 52. The container may be formed of any stiff material which is opaque to actinic light, for example, cardboard, stiff paper, metal, organic plastics and the like, or combinations of such materials, and, in the form shown, comprises a forward section including the forward, end and side walls, and a rear section comprising the rear wall. Forward wall 44 is provided with a rectangular exposure aperture 54 for transmitting light to the photosensitive materials positioned for exposure within the container underlying the forward wall. The container also includes a second or withdrawal opening 56 defined by a rear edge of end wall 48 and rear wall 46, the end wall extending only partially toward the rear wall for this purpose. Withdrawal opening 56 is adapted to permit the various components of the film pack, including film units enclosed within the container, to be withdrawn from the container.

The film pack comprises at least one and preferably a plurality of film units contained entirely within container 42 and adapted to be withdrawn from the container through opening 56. Each film unit comprises a first or photosensitive sheet 60 and a second or print-receiving sheet 62. The photosensitive sheet is rectangular and comprises a layer of a photosensitive material, such as a gelatino silver halide emulsion, carried on a suitable flexible support sheet, such as paper, organic plastics and the like, which is preferably opaque to light actinic to the photosensitive material. Second sheet 62 is substantially equal in width to the photosensitive sheet, is slightly longer and comprises a flexible sheet material such as paper, organic plastics, metallic foil, and the like, and while the second sheet may merely aid in the spreading of a processing fluid in a thin layer on the photosensitive sheet, in the preferred form of film unit, the second sheet is adapted to provide a support for a positive transfer print produced, for example, by a silver halide diffusion-transfer reversal process, such as described in U.S. Patents Nos. 2,543,181, issued February 27, 1951, and 2,662,-822, issued December 15, 1953, both in the name of Edwin H. Land. The second sheet, accordingly, may comprise a print-receiving layer, such as described in the above-mentioned patents, carried on a flexible support sheet. Photosensitive sheet 60 is joined at its leading edge to an end of a first carrier sheet 64 including a leading end section 65; and second sheet 62 is mounted on a second carrier sheet 66 which includes a trailing end section 68, an intermediate section 70 coextensive with the second sheet and a leading end section 72. Print-receiving sheet 62 is mounted on intermediate section 70 of the second carrier sheet with the print-receiving layer located adjacent the carrier sheet, the intermediate section being provided with a generally rectangular aperture 74 defining the area of the print-receiving sheet against which the fluid processing composition is spread and wherein a transfer print is produced. Trailing end section 68 of the second carrier sheet extends belond the trailing end of the second sheet and cooperates with a trailer sheet 76 attached to the trailing end of photosensitive sheet 60 for collecting and retaining excess processing fluid. The first carrier sheet provides a leader for withdrawing the film unit from the camera and the two carrier sheets cooperate for superposing the photosensitive and second sheets in registration with one another, for mounting a container of a fluid processing composition, and for aiding in the release of the processing fluid from the container and spreading of the fluid between the photosensitive and second sheets. The leading end of second carrier sheet 66 is coupled to the first carrier sheet intermediate the ends thereof with the photosensitive and second sheets in register with one another, that is, with their leading ends substantially in alignment and with the photosensitive and print-receiving layers of the two sheets located innermost, facing one another. In other words, that surface of the second carrier sheet which faces in the same direction as the print-receiving layer of the second sheet is secured to that surface of the first carrier sheet which faces in the same direction as the photosensitive layer of the photosensitive sheet.

The photosensitive and second sheets are adapted to be processed by fluid composition carried in a rupturable container, designated 78, mounted on first carrier sheet 64 adjacent the leading end of the photosensitive sheet. Container 78 is formed substantially as shown in the above-mentioned U.S. Patent No. 2,543,181 and comprises a rectangular blank of fluid- and air-impervious sheet metal folded longitudinally upon itself to provide two walls which are bonded together at their margins to form an elongated cavity for the processing fluid. The longitudinal seal is weaker than the end seals and is adapted to become unsealed in response to hydraulic pressure generated within the fluid contents of the container by the application of compressive pressure thereto. The container is mounted on the first carrier sheet with the longitudinal edge which is adapted to become unsealed facing in the direction of the photosensitive sheet and spaced therefrom by a distance approximately equal to the shorter dimension of the container.

The components of each film unit are assembled for exposure in a pack in the relative positions shown in FIG. 3. The photosensitive and print-receiving sheets 60 and 62 overlie one another with the photosensitive and second layers thereof facing in the same direction and the photosensitive layer located outermost in position for exposure. The leading and trailing ends of each sheet are located adjacent, respectively, the trailing and leading ends of the other and the first carrier sheet 64 is folded adjacent the leading edge of the photosensitive sheet so as to extend between the photosensitive and second sheets toward the trailing end of the photosensitive sheet and the leading end of the second sheet. Second carrier sheet 66 is folded adjacent the leading end of the second sheet so as to extend toward the trailing end of the second sheet and the leading end of the photosensitive sheet to a point approximately midway between the ends of the photosensitive and second sheets where leading end section 72 is folded and joined to the mid-portion of first carrier sheet 64. Leading end section 65 extends between the photosensitive and second sheets toward withdrawal opening 56.

The film unit, as part of film pack 40, is assembled around a dividing element in the form of a pressure plate 80 mounted within container 42. Pressure plate 80 is approximately equal in width to the container and comprises a generally flat or planar section underlying exposure aperture 54 and extending beyond the edges of the exposure aperture. The pressure plate includes a rearwardly extending rolled edge section 82 at its trailing edge, rearwardly extending flanges 84 at its lateral edges, and a leading end section 86, including a first portion 88, disposed rearwardly of the planar section underlying the exposure aperture and an end portion 90 located forwardly of first portion 88. Pressure plate 80 is positioned within container 42 with flanges 84 disposed adjacent side walls 52. Portions of rear wall 46 are punched out and deformed inwardly to provide springs (not shown) for engaging flanges 84 and urging pressure plate 80 forwardly against forward wall 44.

Each film unit of the pack is disposed within container 42 with the photosensitive sheet thereof located forward of the pressure plate between the latter and forward wall 44, with the first carrier sheet 64 extending around rolled edge section 82 of the pressure plate, and with second sheet 62 and the second carrier sheet 66 disposed behind the pressure plate between it and rear wall 46, the second carrier sheet and the portions of the first carrier sheet located behind the pressure plate being disposed between the latter and the second sheet. A plurality of film units 58 are provided in the container each arranged in the same manner with the photosensitive sheets arranged in one stack forward of the pressure plate and the second sheets arranged in another stack to the rear of the pressure plate. The photosensitive sheets extend across exposure 54 in position for exposure by light transmitted through the aperture and the second sheets are located behind the pressure plate with their leading ends adjacent withdrawal opening 56 in position to be withdrawn through the opening.

Each film unit includes engagement means for engaging the previous film unit for withdrawing the leading end section of the film unit from the container through opening 56 and from the camera between a pair of pressure-applying members as the previous film unit is being withdrawn from the container between the pressure-applying members. Engagement means for this purpose take the form of clips 98 attached to the end of each leading end section 65 and engaging a portion of the previous film unit. The clips are formed of a resilient material, such as sheet metal or plastic, and are folded upon themselves to form a first portion attached to leading end section 65 and an engagement portion for engaging the previous film unit. Each leading end section 65 is provided with a Z fold intermediate the clip attached thereto and its point of attachment to second carrier sheet 66, for the purpose of allowing the end of the leading end section to be withdrawn from the container between the pressure-applying rolls without moving the photosensitive sheet which is attached to the first carrier sheet. Each clip 98 is coupled around the leading end of the second sheet of the film unit which it comprises, within the container adjacent withdrawal opening 56, with the engagement portion of the clip disposed toward the rear of the second sheet. The film units are so arranged that the rearmost sheet is withdrawn first and the positioning of the leading end of the second sheet between the two portions of the clip causes the free end of the engagement portion of the clip to extend rearwardly into engagement with the photosensitive sheet of the previous film unit as the latter is withdrawn from the container. The portion of the previous film unit which is engaged by the clip borders on an opening 100 provided in trailer sheet 76, so that as a film unit is withdrawn from the container the trailer sheet engages the clip of the next successive film unit, withdrawing leading end section 65 from the container between the pressure-applying members where it may be grasped for drawing the film unit between the pressure-applying members. For details of the construction of film units of this type, including the clips, reference may be had to U.S. Patent No. 2,978,971, issued April 11, 1961 in the name of William E. Eburn, Jr. Photosensitive sheets 60 are restrained against movement by means such as staples 101 securing trailer sheets 76 to end portion 90 of the pressure plate at corner portions of the trailer sheets.

Camera 10 includes a pair of pressure-applying members in the form of rolls 94 and 96 mounted within chamber 32 adjacent opening 36 in the lower end of the chamber. Pressure-applying rolls 94 and 96 are mounted for pivotal movement with their axes substantially in a common plane, and resilient means are provided for biasing the rolls toward one another in juxtaposition. In the preferred arrangement, pressure-applying roll 94 is mounted on the rear housing section and pressure-applying roll 96 is mounted on the forward housing section, so that when the two housing sections are pivoted apart to allow loading of a film pack into chamber 32, the pressure-applying rolls are spaced apart allowing a leader of an element of the film pack to be positioned between the rolls so as to extend therebetween through opening 36 when the two housing sections are pivoted toward one another into operative position. Roll 96 is also mounted for movement, in the plane of the axes of the rolls, toward and away from roll 94. Suitable mounting means for this purpose may include a pair of cantilever springs (not shown) secured to the forward housing section adjacent opposite sides of exposure aperture 18. For an example of another form of mounting means for the pressure-applying rolls, reference may be had to the aforesaid U.S. Patent No. 2,991,702.

The processing fluid which is spread between the photosensitive and second sheets is preferably quite viscous, in order to aid in the rupture of the container and the spreading of the fluid. Spreading of the fluid is accomplished by the pressure-applying rolls and involves advancement of a quantity of the fluid relative to the sheets ahead of the rolls while the quantity of fluid remains substantially stationary with respect to the rolls during movement of the sheets with respect to the rolls between the rolls. Means are provided in the camera for preventing this fluid from escaping between the lateral marginal edges of the sheets as the fluid is being spread in a longitudinal direction between the sheets, i.e., in a direction parallel with the lateral edges. This last-mentioned means comprises a single, elongated engagement member 102 mounted on the forward housing section closely adjacent pressure-applying roll 96 and extending transversely of the direction of movement of the sheets. The film units are moved between the pressure-applying rolls substantially in a plane defined by adjacent portions of the surfaces of the two rolls and engagement member 102 includes an intermediate section 104 having a rear surface which is positioned forwardly of the plane of movement of the sheets between the pressure-applying rolls. Engagement member 102 includes a pair of end sections 106 having rear surfaces inclined toward the rear of the camera housing into and across the plane of movement of the sheets between the pressure-applying rolls.

The rear surfaces of end sections 106 of engagement member 102 bear against the forward surface of the photosensitive sheet of the film unit for deforming the lateral marginal portions of the sheets of the film unit rearwardly out of the plane of movement of the sheets between the pressure-applying rolls. In other words, the engagement member functions to bend the sheets transversely adjacent the pressure-applying rolls. In this manner, the marginal edges of the sheets are drawn against one another with considerable force, particularly inasmuch as end sections 106 are located closely adjacent the rolls and the sheets must bend at their margins around end sections 106 in order to move between the rolls in the plane defined by the adjacent surfaces thereof. The rear surfaces of end sections 106 may be substantially planar; however, in the preferred form shown, they are curved in order to facilitate the imparting of a curvature to the lateral edge portions of the sheets. Each film unit is withdrawn from the camera through opening 36 directly from between the pressure-applying rolls. This may be performed manually and, accordingly, means are provided for guiding each film unit within the camera. This guide means comprises L-shaped sections 108 provided on engagement member 102. Sections 108 extend rearwardly and inwardly toward one another from end sections 106, and are provided for engaging the margins of each film unit and properly guiding the film unit during its movement through the camera between the pressure-applying rolls.

As each film unit is withdrawn from the container between the pressure-applying rolls, the photosensitive sheet of the film unit is required to be held stationary within the container until the photosensitive element of the film unit has moved into superposition with the second sheet. The camera of the invention includes means for performing this function and, in addition, for urging the second sheets of the film unit and the clips forwardly so that the clip of each film unit will engage in the opening 100 in the trailer sheet 76 of the previous film unit. This means comprises a wedge-shaped element 110 mounted on rear wall 28 of the camera housing and providing an inclined ramp extending into the film pack container through an opening 112 formed in rear wall 46 of container 42. The inclined, ramp portion of element 110 is provided with raised lateral ribs 111 on its rear surface, which bear against trailer sheets 76 adjacent the sides of openings 100 therein for facilitating the engagement of the clips in the openings. Wedge-shaped member 110 is provided with a flange which projects forwardly across a portion of withdrawal opening 56 for engaging the leading edges of the second sheets of the film units and preventing movement of the second sheets through withdrawal opening 56. Flange 114 is so constructed as to prevent movement of a second sheet due to frictional forces exerted on the second sheet by another sheet moving within the film pack container, yet allow movement of the second sheet from the container when the second sheet is drawn therefrom by second carrier sheet 66.

In order to insure a complete spread of the fluid in a layer of the desired thickness over a predetermined area which is preferably rectangular, the fluid is generally provided in an amount greater than the minimum required for the desired layer; and this necessity for an excess amount of fluid is only increased by the fact that the fluid, as it is being spread, tends to advance relative to the sheets along a tongue-shaped front which causes a tendency, especially in the case of rectangular areas, to leave portions of the areas uncovered, particularly at the lateral edges. As has been noted in U.S. Patent No. 2,991,703, issued July 11, 1961, in the name of Vaito K. Eloranta, the amount of excess fluid could be reduced appreciably if the fluid, as it is being spread between the sheets, were caused to advance along a front which was approximately straight, was perpendicular to the direction of advancement, and was substantially equal in length to the width of the area over which spreading was supposed to occur.

Flange 114, in the form shown, is located in juxtaposition with engagement member 102 and is designed to perform the function of distributing the processing fluid as it is being spread by the pressure-applying rolls so that the fluid advances relative to the sheets along a front which is comparatively straight rather than tongue-shaped. Flange 114 is positioned within the camera for engaging the mid-portion of the sheets along a line extending perpendicular to the direction of movement of the sheets and exerting pressure on these sheets along this line, tending to inhibit or restrict the spreading of the fluid so that the fluid is distributed outwardly from the mid-portion of the sheets and advances along a front which is approximately a straight line extending from side to side of the area of the sheets over which the fluid is being spread. Engagement member 102 cooperates in supporting the sheets against flange 114 and the pressure applied by flange 114 is insufficient to rupture a container to effect the release of its contents, this being a function of the pressure-applying rolls. The flange is spaced from the rolls so as to engage the sheets along a line spaced from the line of engagement of the sheets by the pressure-applying rolls by a distance approximately equal to or slightly less than the width of the container. This allows the fluid contents of the container to be discharged between the portions of the sheets located between the flange and the pair of pressure-applying rolls where the fluid is confined during spreading. The flange should not be located so close to the pressure-applying rolls as to act upon the container at the same time the pressure-applying rolls are acting upon the container to discharge its fluid contents, inasmuch as the processing fluid may then be released from the container on the side of the flange opposite the pressure-applying rolls with the result that the flange may function to spread the fluid, rather than to distribute the fluid as it is being spread by the pressure-applying rolls. This limitation on the minimum spacing of the flange from the pressure-applying rolls is not applicable in embodiments wherein the fluid is provided between the sheets adjacent an edge of the area over which it is to be spread by other means than the container shown, and, in such embodiments, may be limited only by the amount of fluid which must be contained between the portions of the sheets located between the flange and the pair of pressure-applying rolls.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for treating a photosensitive sheet material with a fluid, said apparatus comprising, in combination: a pair of juxtaposed pressure-applying members for superposing said photosensitive sheet with a second sheet and applying compressive pressure to said sheets for spreading said fluid in a layer therebetween during movement of said sheets substantially in a plane relative to and between said members; means including a support member for guiding said sheets along a predetermined path during movement of said sheets toward and between said pressure-applying members; and means for restraining one of said sheets against movement along said path during movement of another of said sheets relative to and into superposition with said one sheet and for applying pressure to at least the medial portion of said one sheet for controlling the distribution of said fluid between said sheets during spreading of said fluid by said pressure-applying members, the last-mentioned means including an engagement member mounted adjacent said pressure-applying members at one side of said path in juxtaposition with said support member and including a section extending toward said support member into said path in position for engaging the leading end of said one sheet during movement of said other sheet relative to and in superposition with said one sheet to prevent movement of said one sheet, and for engaging and applying pressure to the medial portion of said one sheet during movement of both of said sheets in superposition along said path toward said pressure-applying members, said section of said engagement member including a portion positioned for engaging said medial portion of said one sheet along a line extending transversely of the direction of movement of said sheets.

2. Photographic apparatus for treating a photosensitive sheet material with a fluid, said apparatus comprising, in combination: a pair of juxtaposed pressure-applying members for superposing said photosensitive sheet with a second sheet and applying compressive pressure to said sheets for spreading said fluid in a layer therebetween during movement of said sheets relative to and between said members; and means for restraining the movement of one of said sheets within said apparatus during movement of the other of said sheets toward said members relative to said one sheet into superposition with said one sheet and for applying compressive pressure to said sheets to control the distribution of said fluid between said sheets during spreading of said fluid by said pressure-applying members, the last-mentioned means including means defining a path along which said sheets are advanced toward and between said pressure-applying members, an engagement member mounted adjacent said pressure-applying members at one side of said path and including a section extending into said path in position for engaging the leading end of said one sheet to prevent movement of said one sheet during movement of said other sheet relative to and into superposition with said one sheet, and support means mounted adjacent said pressure-applying members at the opposite side of said path and including sections extending toward said engagement member into said path at the margins of said sheets for supporting the medial portion of said one sheet against said engagement member during movement of said superposed sheets between said pressure-applying members.

3. The photographic apparatus of claim 2 wherein said section of said engagement member includes a portion for engaging said medial portion of said one sheet along a line extending transversely of the direction of movement of said sheets.

4. The photographic apparatus of claim 2 wherein said sheets are moved between said pressure-applying members substantially in a plane and said section of said engagement member is positioned for engaging said medial portion of said one sheet along a line extending transversely of the direction of movement of said sheets and located in a plane parallel with said plane of movement of said sheets between said pressure-applying members.

5. In photographic apparatus including means for exposing photosensitive sheet material and thereafter treating said exposed photosensitive material with fluid, in combination: a pair of juxtaposed pressure-applying members for superposing said photosensitive sheet with a second sheet for applying compressive pressure to said sheets for spreading said fluid in a layer therebetween during movement of said sheets relative to and between said members; and means for restraining the movement of one of said sheets within said apparatus during movement of the other of said sheets within said apparatus relative to said one sheet and into superposition with said one sheet, and for controlling the distribution of said fluid between said sheets during spreading of said fluid by said pressure-applying members; the last-mentioned means including a member mounted adjacent said pressure-applying members and including a portion disposed in the path of movement of said one sheet between said members for engaging only a medial portion of said one sheet at the leading end of said one sheet so as to prevent movement of said one sheet during movement of said other sheet into superposition with said one sheet, and means located in juxtaposition with said last-mentioned member for engaging only the lateral marginal portions of said other sheet for supporting portions of said sheets against said last-mentioned member to cause the latter to apply pressure to at least said medial portion of said one sheet during movement of said superposed sheets between said pressure-applying members and spreading of said fluid therebetween.

6. In photographic apparatus including means for exposing photosensitive sheet material and thereafter treating said exposed material with a fluid, in combination: a pair of juxtaposed pressure-applying members for superposing said photosensitive sheet with a second sheet and applying compressive pressure to said sheets for spreading said fluid in a layer therebetween during movement of said sheets substantially in a plane relative to and between said members; means defining a path along which said superposed sheets are guided during movement of said sheets between said pressure-applying members; and means for restraining one of said sheets against movement along said path within said apparatus during movement of the other of said sheets relative to said one sheet into superposition with said one sheet and for controlling the distribution of said fluid between said sheets during spreading of said fluid by said pressure-applying members, the last-mentioned means comprising a first engagement member positioned adjacent said pressure-applying members and including a portion extending from one side of said path of movement of said sheets into said path for engaging the leading end of said one sheet so as to prevent movement of said one sheet during movement of said other sheet into superposition with said one sheet, and for applying compressive pressure to said medial portion of said one sheet along a line extending transversely of the direction of movement of said sheets during movement of said superposed sheet along said path past said first engagement member and between said pressure-applying members, and a second engagement member mounted in juxtaposition with said first engagement member and including portions extending from the opposite side of said path toward said first engagement member for engaging the lateral marginal portions of said other sheet and supporting said sheets against said first engagement member.

7. The photographic apparatus of claim 6 wherein said portion of said first engagement member engages only the medial portion of said one sheet and said portions of said second engagement member engage only the lateral marginal portions of said other sheet.

8. Photographic apparatus for treating a photosensitive sheet with a fluid composition, said apparatus comprising, in combination: pressure-applying means mounted in the path of movement of said photosensitive sheet and a second sheet for engaging said sheets along a line extending transversely of the direction of movement of said sheets relative to said means, superposing said sheets and spreading a fluid in a layer between said superposed sheets; and means mounted in said path adjacent said pressure-applying means for engaging the leading end of one of said sheets to prevent the movement of other of said sheets relative to and into superposition therewith and for applying compressive pressure to said superposed sheets along a line extending transversely of the direction of movement of said sheets adjacent the first-mentioned line to control the distribution of said fluid as the latter is being spread by said pressure-applying means, the last-mentioned means including a member positioned for contacting said one sheet only at a medial portion thereof and along the last-mentioned line which is substantially shorter than said first-mentioned line of engagement of said sheets by said pressure-applying means and means located adjacent said pressure-applying means in juxtaposition with the last-mentioned member for engaging the lateral marginal portions of said other sheet for supporting said sheets against said last-mentioned member.

References Cited in the file of this patent

UNITED STATES PATENTS 2,740,341    McCune _____ Apr. 3, 1956